United States Patent [19]

Ikejiri

[11] Patent Number: 4,556,905
[45] Date of Patent: Dec. 3, 1985

[54] VERTICAL SYNCHRONIZING CONTROL CIRCUIT

[75] Inventor: Hiroaki Ikejiri, Suwa, Japan

[73] Assignee: Kabushiki Kaisha Suwa Seikosha, Tokyo, Japan

[21] Appl. No.: 550,652

[22] Filed: Nov. 10, 1983

[30] Foreign Application Priority Data

Nov. 11, 1982 [JP] Japan ................... 57-197956

[51] Int. Cl.⁴ ............................. H04N 5/10
[52] U.S. Cl. ......................... 358/154; 358/155; 358/158; 328/139
[58] Field of Search ............ 358/153, 154, 155, 158, 358/149, 150; 328/139

[56] References Cited

U.S. PATENT DOCUMENTS

| 3,708,621 | 1/1973 | Yamamoto | 358/158 |
| 3,878,336 | 4/1975 | Balaban | 358/155 |
| 3,962,540 | 6/1976 | Kokado | 358/154 |
| 4,227,214 | 10/1980 | Morito et al. | 358/154 |
| 4,253,116 | 2/1981 | Rodgers, III | 358/149 |
| 4,349,839 | 9/1982 | McGinn | 358/154 |
| 4,402,011 | 8/1983 | Newton | 358/153 |
| 4,491,870 | 1/1985 | Aschwanden | 358/154 |

Primary Examiner—John C. Martin
Assistant Examiner—Michael D. Parker
Attorney, Agent, or Firm—Blum Kaplan Friedman Silberman & Beran

[57] ABSTRACT

After an external vertical synic signal is inputted, a divider circuit counts a predetermined number of clock pulses and delivers a vertical sync signal and a control signal allowing the external signal to pass through a gate circuit. The external vertical sync signal passing through the gate circuit resets the counter and a control signal from a detector circuit blocks the gate circuit until the counter delivers the next control signal. The divider circuit delivers a vertical sync pulse with proper timing and resets itself if the external signal is weak or absent.

12 Claims, 7 Drawing Figures

VERTICAL SYNCHRONIZING CONTROL CIRCUIT

BACKGROUND OF THE INVENTION

This invention relates generally to a television receiver and more particularly to a vertical synchronizing control circuit for generating stable, precise vertical synchronizing control signals for the display device. In the prior art, an internally generated vertical sync signal is synchronized in phase with the external vertical sync signal by directly resetting a divider circuit. The divider circuit divides a frequency which is a multiple of the horizontal sync signal fH. Therefore, if the external vertical sync signal includes noise, the divider circuit is reset not only by the external vertical sync signal, but also by noise carried with that signal. This results in the occurrence of a false internal vertical sync signal which is synchronized to the noise and stable vertical synchronization is not achieved for the display device. Also, if the externally received signal fades, there may not be always vertical sync signal generated internally.

What is needed is a vertical synchronizing control circuit which provides stable sync signals for a display device regardless of noise or weakness in the externally received television transmission and its vertical sync signal.

SUMMARY OF THE INVENTION

Generally speaking, in accordance with the invention, a vertical synchronizing control circuit especially suitable for providing stable vertical synchronization for a television display under noisy or weak reception conditions is provided. There is a relationship between the frequency of the horizontal sync signal fH and the frequency of the vertical sync signal fV. This relationship is represented by the equation: $nfH = mfV$, wherein m and n are integers. For example, $2fH = 525fV$ in a M/NTSC system. Therefore, by counting a stabilized internal horizontal sync signal, an internally generated vertical sync signal is obtained. The internally generated vertical sync signal is generated in phase synchronization with the externally received vertical sync signal when the external vertical sync signal is used to reset the counter. This counter circuit delivers the internal vertical sync signal after counting a predetermined number of pulses even when the external vertical sync signal is not received due to poor reception. Thus, it is possible to provide stable vertical synchronization for a display device. Also, false vertical sync signals which are caused by noise in the externally received signal are eliminated. This is accomplished in the circuit of this invention in that the display is controlled by the internally generated vertical sync signal from the counter circuit while the external vertical sync signal only provides information regarding the phase of the internal vertical sync signal.

The counter, that is, a divider circuit, is reset not directly by the external vertical sync signal, but by an external vertical sync signal which has passed through a gate circuit for phase synchronization. The gate circuit obstructs the external signal except during periods when the sync signal is anticipated.

In particular, after an external vertical sync signal is inputted, a divider circuit counts a predetermined number of clock pulses and then delivers a control signal which allows the external signal to pass through a gate circuit. After the external vertical sync signal passes through the gate circuit, a control signal from a detector circuit blocks the external sync signal from passing through the gate circuit until the counter delivers the next control signal, that is, at the time when a sync signal is anticipated. While the gate is blocked, noise cannot pass through the circuit and false synchronization signals are avoided. When the external signals fade, after an previous vertical sync signal has been received, the divider circuit delivers a vertical sync pulse with the proper timing nevertheless, and resets itself.

Accordingly, what is needed is an improved vertical synchronizing control circuit for a television receiver which provides stable vertical synchronization signals for the display even when the externally received signal is noisy.

Another object of this invention is to provide an improved vertical synchronizing control circuit for a television receiver which outputs internally generated vertical sync signals when the externally received signal fades due to poor reception.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

This invention relates to a vertical synchronizing control system for generating stable and precise vertical synchronizing control signals in a television receiver which comprises a circuit for forming a vertical synchronizing control signal by dividing a signal having a frequency which is an integral multiple of the horizontal synchronizing signal frequency in synchronism with the horizontal synchronizing signal.

In a conventional vertical synchronizing control circuit of a television receiver, it is well known that the vertical synchronizing control signal is formed by dividing a signal having a frequency which is an integral multiple of the horizontal synchronizing signal. The vertical sync control signal (internal vertical sync control signal) is used for display control instead of an externally input vertical sync signal, but in synchronism with the external vertical sync signal.

Figure 1:
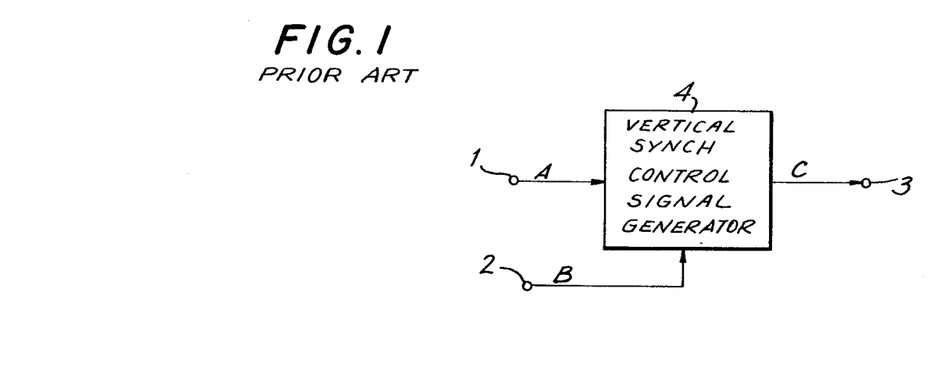
FIG. 1 is a block diagram of a vertical synchronizing control circuit of the prior art.

That is, in the prior art, the vertical sync control signal is directly synchronized with the external vertical sync signal separated from the TV signal as shown in FIG. 1.

FIG. 1 shows a block diagram of a conventional vertical sync control circuit. An input terminal 1 receives a signal having a frequency n times greater than the frequency fH of a horizontal sync signal (hereinafter referred to as nfH signal) in synchronism with the horizontal sync signal separated from the TV signal (n is an integer). Input terminal 2 receives an external vertical sync signal, and terminal 3 outputs a vertical sync control signal from a vertical sync control signal forming circuit 4. The nfH signal is input into the vertical sync control signal forming circuit 4 through the input terminal 1. In the vertical sync control signal forming circuit 4, the input nfH signal is divided to form the vertical sync control signal synchronized with the external vertical sync signal input through the input terminal 2. Then, the vertical sync control signal is delivered to output terminal 3.

Figure 2:
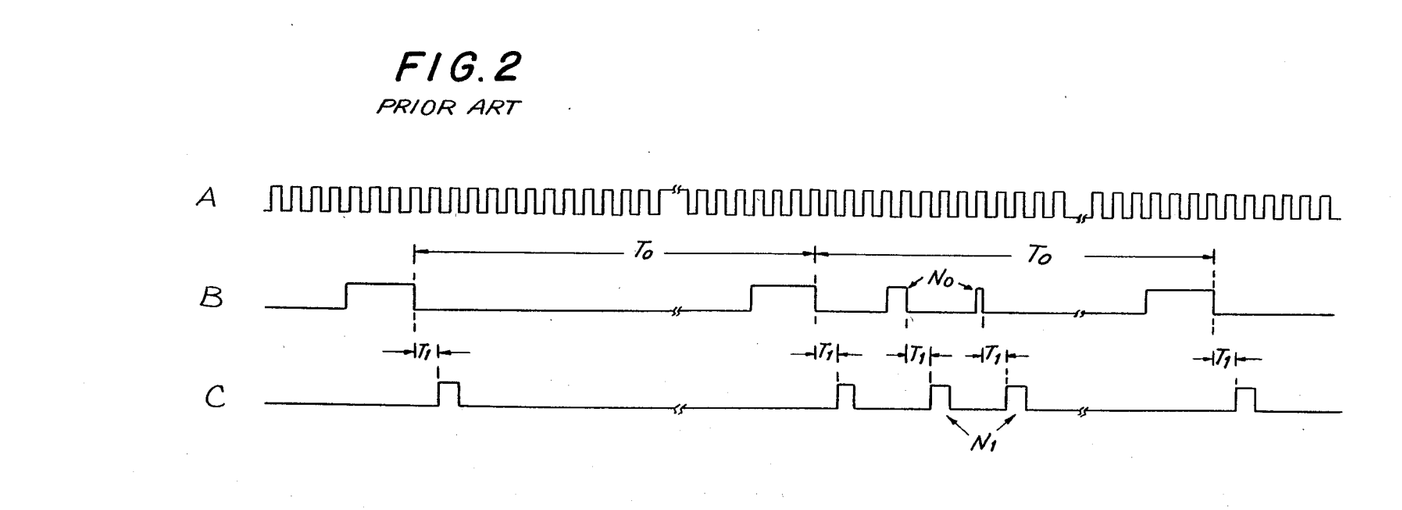
FIG. 2 is a timing chart associated with the circuit of FIG. 1.

FIG. 2 is a timing chart showing the waveforms at three points A, B, C in the circuit of FIG. 1 of the waveforms shown in FIG. 2, A is the nfH signal, which is input to the vertical sync control signal forming circuit 4 through the input terminal 1. The waveform as shown in FIG. 2 at B is the signal after shaping the waveform of the vertical sync signal separated from a TV signal, wherein To is the period of the vertical sync signal and No is noise. The waveforms as shown in FIG. 2 at C is a vertical sync control signal formed in the vertical sync control signal forming circuit 4 in FIG. 1, wherein T1 is a vertical blanking period and a delay time including the vertical sync control signal required for various kinds of display devices, and N1 is a vertical sync control signal in synchronism with the noise No in waveform B, namely a vertical sync control signal which is generated unrelated to a noise-free external vertical sync signal.

As illustrated in FIG. 2, the conventional vertical sync control circuit generates a vertical sync control signal in synchronism with not only each external vertical sync signal but also in response to noise included in the external vertical sync signal. As a result, this conventional vertical sync control circuit has a disadvantage in that quality of the TV screen display is deteriorated by unstable vertical synchronization, due to the vertical sync control signal N1 generated in synchronism with the noise included in the external vertical sync signal B.

In order to eliminate the above disadvantages, this invention provides a vertical sync control circuit which generates stable and precise vertical sync control signals even if the external vertical sync signal includes noise or the external vertical sync signal falls off (fades) due to a sudden change of field intensity.

The following are the detailed description of the embodiments in accordance with the invention.

Figure 3:
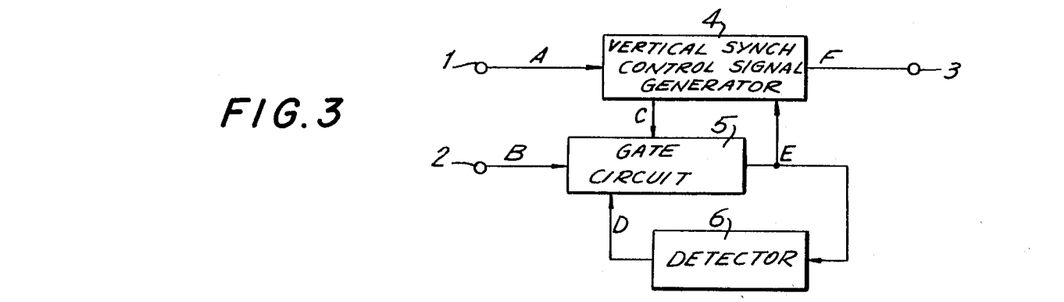
FIG. 3 is a block diagram of a vertical synchronizing control circuit in accordance with the invention.

FIG. 3 shows a block diagram of a vertical sync control circuit in accordance with this invention. An input terminal 1 receives the nfH signal; an input terminal 2 receives the external vertical sync signal; terminal 3 outputs a vertical sync control signal; a vertical sync control signal forming circuit 4 delivers a first control signal and the vertical sync control signal. A gate circuit 5 controls the passage of the external vertical sync signal and a detector circuit 6 detects the passing of the external vertical signal through the gate circuit 5 and delivers a second control signal. Even if the external vertical sync control signal falls off due to, for example, a sudden change of field intensity, the vertical sync control signal forming circuit 4 continues to count the nfH signal with the same period as the vertical sync signal, to deliver a vertical sync control signal and the first control signal which are the same as the vertical sync signal in frequency.

Figure 4:
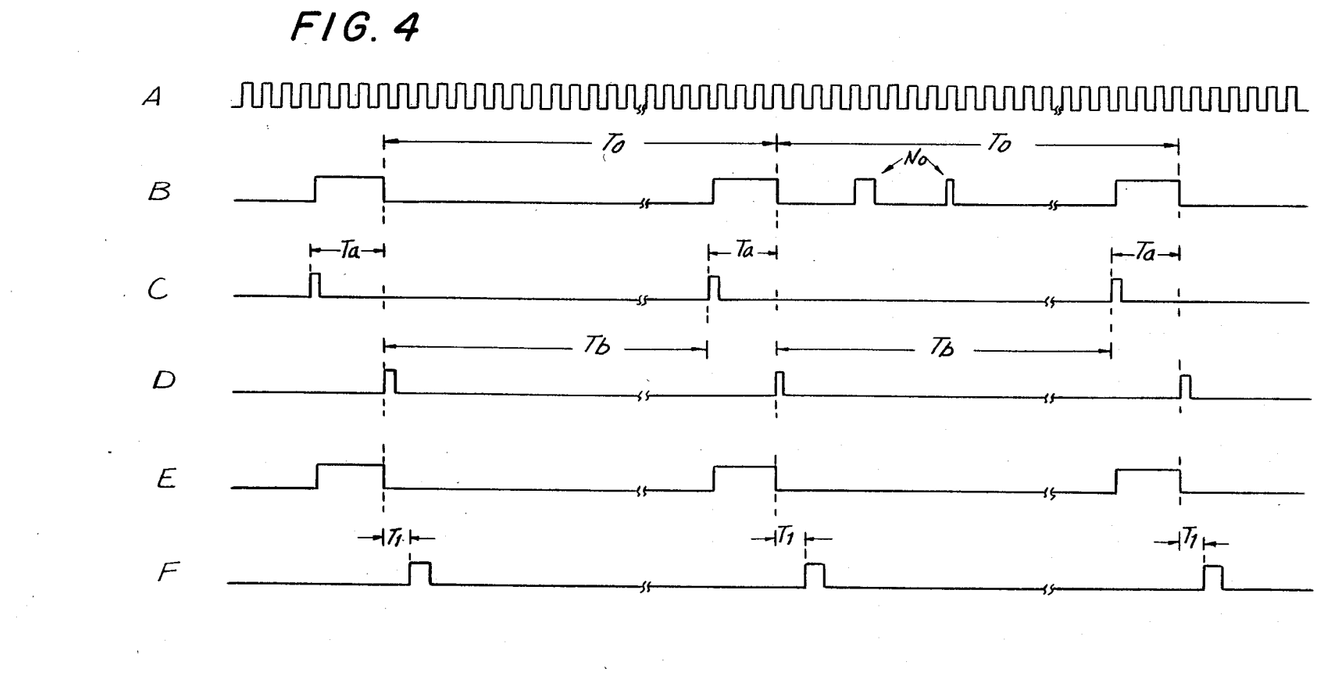
FIG. 4 is a timing chart showing waveforms associated with the circuit of FIG. 3 when an external vertical sync signal includes noise.
Figure 5:
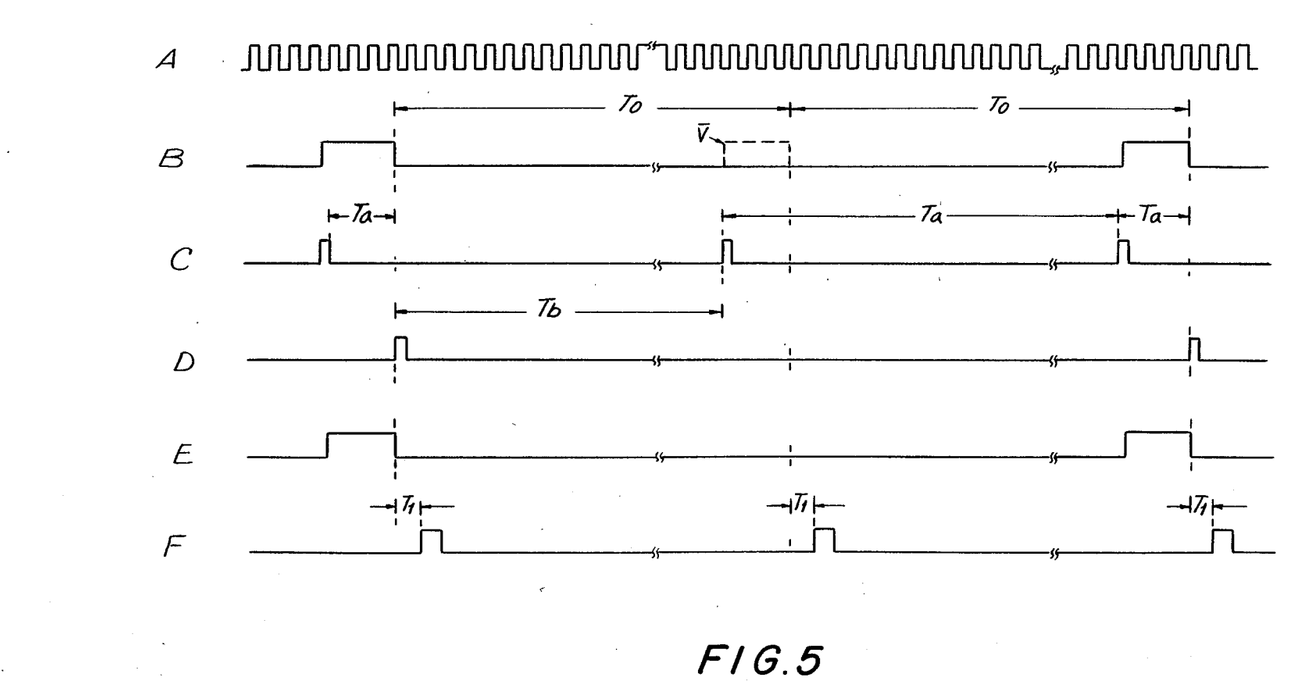
FIG. 5 is a timing chart of waveforms associated with the control circuit of FIG. 3 when the externally received vertical sync signal is weak or absent due to a change in field intensity of the signal during reception.

FIGS. 4 and 5 are timing charts showing the waveforms at various points in the vertical sync control circuit of FIG. 3, which is in accordance with this invention. In FIGS. 4 and 5, waveform A indicates the nfH signal; waveform B indicates a signal after shaping the pulse of the external vertical sync signal, separated from a received TV signal; waveform C indicates a first control signal which allows the external vertical sync signal to pass through the gate circuit 5; waveform D indicates a second control signal which inhibits the external vertical sync signal from passing through the gate circuit 5; waveform E indicates an external vertical sync signal passed through the gate circuit 5; and waveform F indicates a vertical sync control signal.

FIG. 4 is a timing chart when the external vertical sync signal includes noise.

The nfH signal as shown in waveform A is input into the vertical sync control signal forming circuit 4 through the input terminal 1 for the nfH signal. In the vertical sync control signal forming circuit 4, the nfH signal input is divided to deliver the first control signal and the vertical sync control signal which is necessary to the vertical sync control of various display devices. Herein, To in waveform B represents a period of the vertical sync signal and No represents noise. When inputting the first control signal, as shown in FIG. 4 at C, to the gate circuit 5, the gate circuit 5 allows the external vertical sync signal input from terminal 2 to pass through during periods Ta. The detector circuit 6 detects the external vertical sync signal passed through the gate circuit 5 and delivers the second control signal. When inputting the second control signal (FIG. 4) D to the gate circuit 5, the external vertical sync signal input at terminal 2 is inhibited from passing through the gate circuit 5 during periods Tb, that is, until the first control signal is input. In this way, as shown in FIG. 4 at E, F, noise No is inhibited from passing through the gate circuit 5. As a result, stable and precise vertical sync control signals can be obtained without noise No. Herein, T1 in FIG. 4 at F represents a delay time including the vertical sync control signal which is necessary to the vertical blanking period and various types of display devices.

FIG. 5 is a timing chart when the external vertical sync signal falls off due to such factors as a sudden change of field intensity.

In the vertical sync control circuit in accordance with this invention, vertical sync control isn't performed with the external vertical sync signal but with a vertical sync control signal which is formed by dividing the nfH signal. Accordingly, even if the external vertical sync signal is weak or not detectable, the vertical sync control signal forming circuit 4 counts the nfH signal, and thereby delivers the vertical sync control signal to a display device with the same period as that of normal external vertical sync signal. In this case, if the vertical sync control signal is synchronized with the previous external vertical sync signal, before the external vertical sync signal falls off, that is, fades, a stable and precise vertical sync control signal is obtained as shown in FIG. 5 at F as well as the condition where the external vertical sync signal is normal. Herein, V in FIG. 5 at B indicates the weakened or absent external vertical sync signal; To is a period of the vertical sync signal; T1 is a delay time including the vertical sync signal necessary to the vertical blanking period and various type of display devices; Ta is a period when the external vertical sync signal input from terminal 2 in FIG. 3 is allowed to pass through the gate circuit 5; and Tb is a period when an external vertical sync signal input from terminal 2 in FIG. 3 is inhibited to pass through the gate circuit 5.

Moreover, when such the weakened state of the external vertical sync signal returns to its normal input state, it is possible to immediately respond to the input of the external vertical sync signal in accordance with this invention. That is, when the external vertical sync signal has fallen off, the second control signal isn't delivered from the detector circuit 6, as it doesn't detect the external vertical sync signal. As a result, the gate circuit 5 maintains the state where a subsequent external vertical sync signal is allowed to pass through. This enables the external vertical sync signal to immediately pass through the gate circuit 5 when it is input from the input terminal 2. Therefore, the vertical sync control signal can be synchronized with the external vertical sync signal. For example, although the external vertical sync signal is often diminished when tuning a television receiver, it is possible to obtain a stable screen synchronized with the external vertical sync signal immediately, in accordance with this invention.

In FIGS. 4 and 5, output timing of the first and second control signals is one operating mode of this invention. The first control signal can be output at various timing, viz., not only before the expected timing when an external vertical sync signal is input, but at an expected timing of the leading edge of the external vertical sync signal or after the expected timing when an external vertical sync signal has been already input. Further, the second control signal can be output at various timing, viz., not only at the detected timing of the trailing edge of the external vertical sync signal, but at the detected timing of the leading edge of the external vertical sync signal or at a timing when a fixed period has passed after the leading edge of the external vertical sync signal. According to the combination of the output timing of the first control signal with the second control signal, the external vertical sync signal passed through the gate circuit 5 sometimes differs in pulse width from that signal input from terminal 2. However, in this case, it is also possible to construct a vertical sync control circuit in accordance with this invention.

Figure 6:
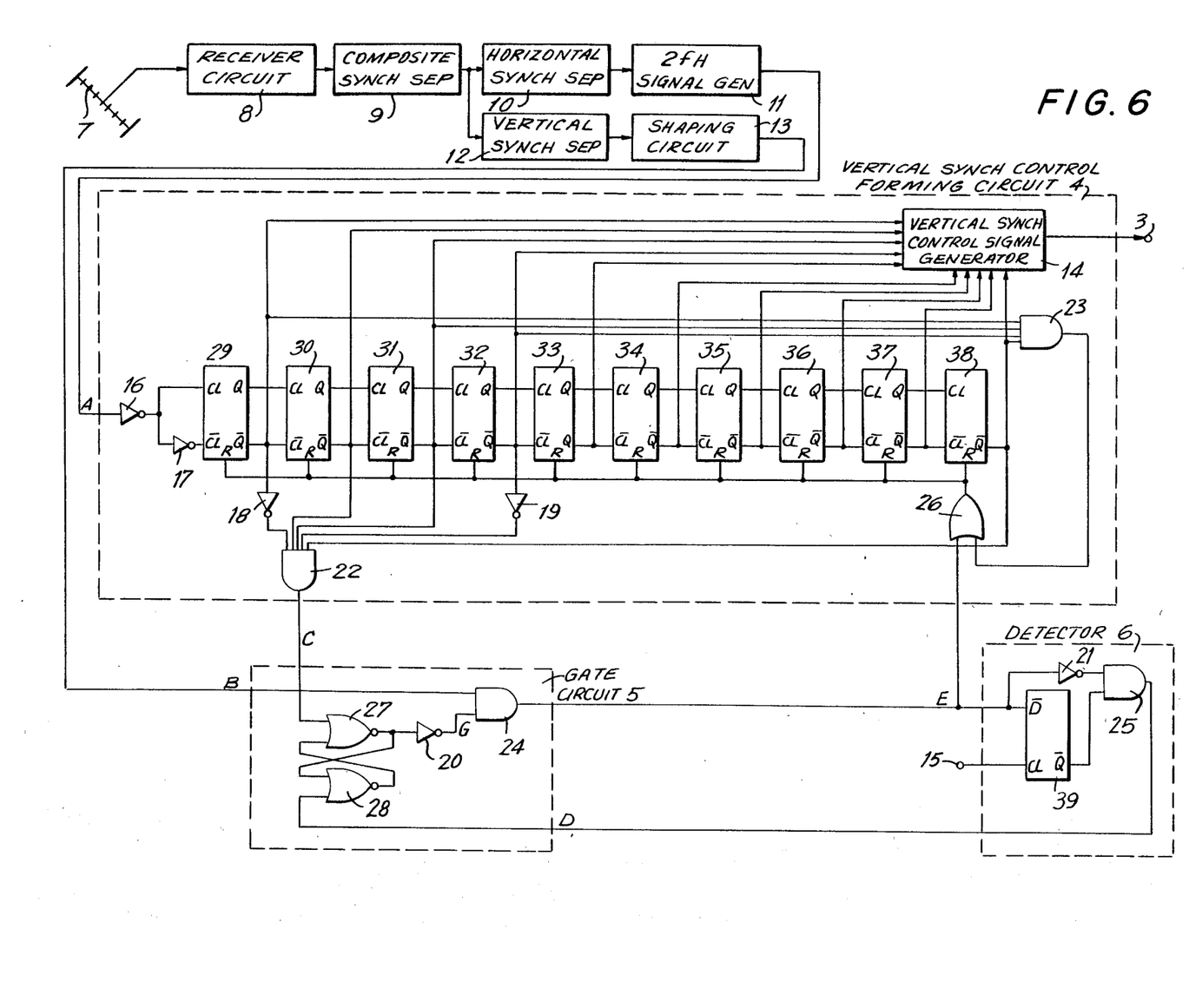
FIG. 6 is a television receiver circuit including a vertical synchronizing control circuit in accordance with the invention.

FIG. 6 illustrates one embodiment of a television receiver wherein a vertical sync control circuit of this invention is applied. The receiver includes an antenna 7; a video receiver circuit 8 wherein a signal of a desired channel is picked from the signals provided to the antenna 7 and amplified and detected for obtaining a television signal; a synchronizing separator circuit 9 for separating a composite synchronizing signal from the television signal (composite video signal); a horizontal sync signal separator circuit 10 for separating a horizontal sync signal from the composite synchronizing signal; a 2fH signal generating circuit 11 for generating a signal in synchronism with the horizontal sync signal, which frequency is twice that of the horizontal sync signal; a vertical sync signal separator circuit 12 for separating a vertical sync signal from the composite sync signal; a waveform shaping circuit 13 for waveform shaping of the output of the vertical sync signal separator circuit 12; a vertical sync control signal forming circuit 4 where 2fH signal is counted and then a vertical sync control signal which is the same frequency as that of the vertical sync signal is formed; gate circuit 5; a detector circuit 6; inverters 16 to 21; AND gates 22 to 25, NOR gates 27, 28, OR gate 26, binary counters 29 to 38 (hereinafter referred to as FF); delay flipflop 39, (hereinafter referred to as D-FF); a circuit 14 for forming a vertical sync control signal corresponding to a display device, wherein the output of FF 29 to FF 38 is input to form vertical sync control signal corresponding to the various types of display devices; and an arbitrary clock input terminal 15.

Figure 7:
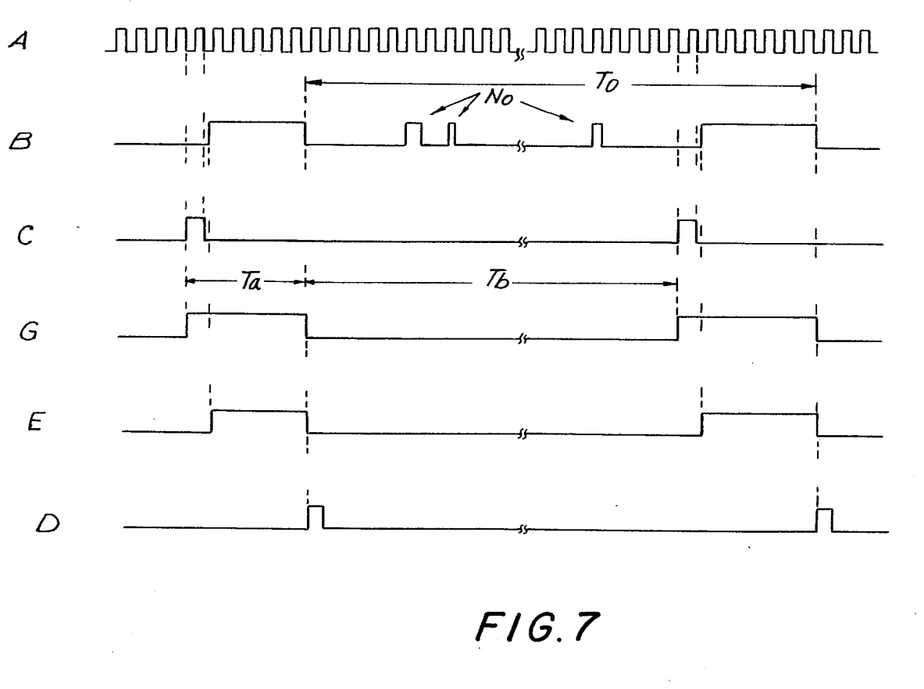
FIG. 7 is a timing chart of waveforms associated with the circuit of FIG. 6.

FIG. 7 is a timing chart showing the waveforms at various points A, B, C, G, E, D in the circuit of FIG. 6, which is in accordance with this invention. The 2fH signal in FIG. 7 at A is input from the 2fH signal generating circuit 11 to the vertical sync control signal forming circuit 4. In the vertical sync control signal forming circuit 4, the 2fH signal input is divided by 525 times in one field by means of FF 29 to 38, whereby a vertical sync control signal is formed in a circuit 14 for forming a vertical sync control signal corresonding to a display device by using the output of each FF, and the first control signal which allows the external vertical sync signal to pass through the gate circuit 5 is formed in an AND gate 22. Herein, the waveform in FIG. 7 at B represents an output signal of the waveform shaping circuit 13, viz., external vertical sync signal, To represents a period of the vertical sync signal and No represents noise. When the first control signal as shown in FIG. 7 at C, viz., high-level output of the AND gate 22 is input to inverter 20 through the NOR gate 27, the output of the inverter 20 goes to a high level as shown in FIG. 7 at G. The inverter 20 maintains the output at high level until the second control signal delivered from the detector circuit 6, viz., high-level output of the AND gate 25 is input to the inverter 20 through NOR gate 28. As shown in FIG. 7 at E, the external vertical sync signal passes through the AND gate 24 during period Ta when the output of the inverter 20 is at high level. When the external vertical sync signal passes through the AND gate 24, the output of the OR gate 26 becomes high and FF 29 to FF 38 are reset.

At the same time, as the D-FF 39 and inverter 21 in the detector circuit b detects the trailing edge of the external vertical sync signal, the output of the AND gate 25 becomes high as shown in FIG. 7 at D and the second control signal is delivered therefrom. When the second control signal is deliveredfrom the AND gate 25, inverter 20 maintains the output of the AND gate 22 at low level during period Tb, namely, until the output of AND gate 22 goes high. As shown in FIG. 7 at E, the external vertical sync signal can not pass through AND gate 24 during period Tb while the output of inverter 20 is low level. In this way, noise No as shown in FIG. 7 B is not included in the output of AND gate 24. This prevents a reset of FF 29 to FF 38 due to noise No from occurring and enables stable and precise vertical sync control signals to be delivered to a display device, even if the external vertical sync signal includes noise No. Further, if the external vertical sync signal fades, the 2fH signal is counted 525 times by the FF 29 to FF 38 repeatedly and AND gate 23 delivers high-level outputs with the same period as that of the vertical sync signal to reset FF 29 to FF 38. Therefore, although the external vertical sync signal is faded off, it is possible to deliver the vertical sync control signal to a display device with the same frequency as that of the vertical sync signal. In this case, if the vertical sync control signal is synchronized with the previous external vertical sync signal before the external vertical sync signal fades, the vertical sync control signal is as stable and precise as in the case where the external vertical sync signal does not fade.

The described invention of FIG. 6 provides one embodiment of an M/NTSC system, that is, one television standard system for transmitting a television signal. However, the vertical sync control circuit in accordance with this invention can also be applied easily in such a system as B/PAL by changing the vertical sync control signal forming circuit 4, and so on. Further, the gate circuit 5 gives priority to the first control signal over the second control signal in this invention, but a circuit construction which reverses the process is possible. Moreover, the detector circuit 6 is described as a circuit for detecting the trailing edge of the external vertical sync signal in this invention, but it is possible to provide a circuit for detecting the leading edge of the external vertical sync signal due to, for example, a change of output timing of other signals. Even if omitting the 2fH signal generating circuit 11 in FIG. 6, it is possible to provide a vertical sync control circuit in accordance with this invention by varying the construction of the vertical sync control signal forming circuit 4. Supplementarily, as shown in FIGS. 3 to 7, signal E corresponds to signal D so that it is possible to input signal D to the vertical sync control signal forming circuit 4.

As stated above, in accordance with this invention, a vertical sync control circuit, wherein the vertical sync control signal is formed by dividing a signal of a frequency which is integral multiples of the frequency of the horizontal sync signal, provides stable and precise vertical sync control signals to a display device. The current is immediately synchronized with the external vertical sync signal even if the external vertical sync signal includes noise, or if it falls due to such as a sudden change of the field intensity. Therefore, in accordance with this invention, an optimum portable television receiver can be obtained.

What is claimed is:

1. A vertical synchronizing control circuit receiving an external vertical sync signal, comprising:
    a vertical sync control signal forming circuit having counter means counting an inputted clock signal and delivering in response to said counting a first control signal and a vertical sync control signal, said control signals having the same frequency as said external vertical sync signal, said control signal forming circuit having a first control terminal and circuit means for synchronizing said vertical sync control signal with said external vertical sync signal;
    gate circuit means for controlling passage of said external vertical sync signal, said gate circuit means having a second control terminal which when driven by said first control signal allows said external vertical sync signal to pass through said gate circuit means, and a third control terminal which when driven inhibits said external vertical sync signal from passing;
    a detector circuit for detecting the passing of said external vertical sync signal through said gate circuit, said detector circuit delivering a second control signal when said external vertical sync signal is detected passing said gate circuit means, said second control signal being applied to said third control terminal to block said gate circuit means,
    said circuit means for synchronizing said vertical sync control signal being input said external vertical sync signal passing through said gate circuit means at said first control terminal of said vertical sync control signal forming circuit, noise in said external signal being excluded from said circuit means for synchronizing when said gate circuit means is blocked.

2. A vertical synchronizing control circuit as claimed in claim 1, wherein said second control signal follows said first control signal in time, said second control signal blocking said gate circuit means to said external signal after said first control signal has opened said gate circuit means to said external signal, said gate circuit means being reopened by the next first control signal.

3. A vertical synchronizing control circuit as claimed in claim 2, wherein said circuit means for synchronizing operates to reset said counter means at input at said first control terminal of said external sync signal from said gate circuit means.

4. A vertical synchronizing control circuit as claimed in claim 3, and further comprising means for resetting said counter means in response to a preselected count of said counter means, said preselected count corresponding to the period of said external vertical sync signal, occurrence of said preselected count causing output of first control signal and said counter means to reset even should said external vertical sync signal from said gate circuit means be weak or absent.

5. A vertical synchronizing control circuit as claimed in claim 1, wherein said gate circuit means includes a set-reset circuit, said first control signal setting said set-reset circuit, said second control signal resetting said set-reset circuit, the output of said gate circuit means changing only for alternating first and second control signals.

6. A vertical synchronizing control circuit as claimed in claim 1, wherein said detector circuit includes a delay type flipflop, the output of said detector circuit being later than the leading edge of said external vertical sync signal passed through said gate circuit means.

7. A vertical synchronizing control circuit as claimed in claim 5, wherein said detector circuit includes a delay type flipflop the output of said detector circuit being later than the leading edge of said external vertical sync signal passed through said gate circuit means.

8. A vertical synchronizing control circuit as claimed in claim 1, wherein said circuit means for synchronizing includes an OR gate, one input to said OR gate being connected to said first control terminal the output of said OR gate resetting said counter means.

9. A vertical synchronizing control circuit as claimed in claim 1, wherein said detector output corresponds with the trailing edge of said external sync signal passing through said gate circuit means.

10. A vertical synchronizing control circuit as claimed in claim 8, wherein an input to a second terminal of said OR gate corresponds to an output from said counter means in response to a preselected count of said counter means, a signal to either of said OR gate inputs resetting said counter means, said preselected count corresponding to the frequency of said external vertical sync signal.

11. A vertical synchronizing control circuit as claimed in claim 10, wherein said vertical sync control signal is delivered from said forming circuit upon completion of said preselected count by said counter means.

12. A vertical synchronizing control circuit as claimed in claim 4, wherein said gate circuit means includes a set-reset circuit, said first control signal setting said set-reset circuit, said second control signal resetting said set-reset circuit, the output of said gate circuit means changing only for alternating first and second control signals, and said detector circuit includes a delay type flip-flop, the output of said detector circuit being later than the leading edge of said external vertical sync signal passed through said gate circuit means.

* * * * *